United States Patent
Furlan et al.

(10) Patent No.: US 12,236,467 B2
(45) Date of Patent: Feb. 25, 2025

(54) VEHICULAR SEARCH RECOMMENDATIONS USING MACHINE LEARNING

(71) Applicant: Capital One Services, LLC, McLean, VA (US)

(72) Inventors: Elizabeth Furlan, Plano, TX (US); Chih-Hsiang Chow, Coppell, TX (US); Steven Dang, Bellevue, WA (US)

(73) Assignee: Capital One Services, LLC, McLean, VA (US)

( * ) Notice: Subject to any disclaimer, the term of this patent is extended or adjusted under 35 U.S.C. 154(b) by 930 days.

(21) Appl. No.: 17/211,319

(22) Filed: Mar. 24, 2021

(65) Prior Publication Data

US 2022/0309556 A1    Sep. 29, 2022

(51) Int. Cl.
| | |
|---|---|
| *G06Q 30/0601* | (2023.01) |
| *G06F 16/9538* | (2019.01) |
| *G06N 5/02* | (2023.01) |
| *G06N 20/00* | (2019.01) |

(52) U.S. Cl.
CPC ..... *G06Q 30/0631* (2013.01); *G06F 16/9538* (2019.01); *G06N 5/02* (2013.01); *G06N 20/00* (2019.01)

(58) Field of Classification Search
CPC ...... G06Q 30/0631; G06N 20/00; G06N 5/02; G06F 16/9538
See application file for complete search history.

(56) References Cited

U.S. PATENT DOCUMENTS

| | | | | |
|---|---|---|---|---|
| 6,970,865 | B1 * | 11/2005 | Plasek | G06F 16/2246 |
| 2016/0283547 | A1 * | 9/2016 | Ridgway | G06F 16/2455 |
| 2018/0349382 | A1 * | 12/2018 | Kumaran | G06F 17/12 |
| 2020/0019632 | A1 * | 1/2020 | Larchev | G06F 16/242 |
| 2023/0142401 | A1 * | 5/2023 | Brook | G06N 3/08 |
| | | | | 706/12 |

OTHER PUBLICATIONS

P. Thiengburanathum, S. Cang and H. Yu, "A decision tree based recommendation system for tourists," 2015 21st International Conference on Automation and Computing (ICAC), Glasgow, UK, 2015, pp. 1-7, doi: 10.1109/IConAC.2015.7313958 (Year: 2015).*

* cited by examiner

*Primary Examiner* — Michelle T Kringen
(74) *Attorney, Agent, or Firm* — KDW FIRM PLLC

(57) ABSTRACT

Systems, methods, and computer readable media for vehicular search recommendations using machine learning. A computing model may receive a query for a vehicular recommendation. The model may be trained based on historical queries, webpages visited, and attributes of vehicles. The model may generate a decision tree comprising a plurality of paths for processing the query, the plurality of paths comprising a subset of a plurality of available paths for processing the query, each path associated with a plurality of search phases. The model may select, based on the decision tree, a first path of the plurality of paths for processing the query. The model may select, based on the first path, a first search phase of the plurality of search phases as corresponding to the query. The model may then return a search result corresponding to the first search phase as responsive to the query.

20 Claims, 9 Drawing Sheets

104-1

104-2

Welcome to the vehicle search platform! Let's get started. What can we help you find?

SUV  301

Search
302

Optional Criteria:

☐ Fuel Efficient  ☐ Safety features  ☐ Sporty  ☐ Self Driving  ☐ Reliable

Got it! You're looking for an SUV. We've automatically updated your search to show you SUV's that have good safety ratings. Click on any vehicle to learn more.

- SUV ABC
- SUV XYZ ⎫
- ..... ⎬ — 310
- SUV 123 ⎭

☐ Fuel Efficient  ☐ Safety features  ☐ Sporty  ☐ Self Driving  ☐ Reliable

102

300

You selected SUV 123. Here's some information on SUV 123. Click to find out more:

- 10 miles per gallon
- Top rated safety
- ....
- Practical yet rugged

⎫
⎬ 330
⎭

The fuel efficiency of SUV 123 is impractical for some users. Here's inventory for SUV ABC in your area. Click to find out more:

- 2021 SUV ABC – Fully Loaded! $49,000
- 2020 SUV ABC – Last one! $45,000
- ...
- 2021 SUV ABC – Safety package included! $46,000

VEHICULAR SEARCH RECOMMENDATIONS USING MACHINE LEARNING

TECHNICAL FIELD

Embodiments disclosed herein are related to computing systems. More specifically, embodiments disclosed herein are related to computing systems which provide vehicular search recommendations using machine learning.

BACKGROUND

When initiating a search for a vehicle on the Internet, users often have little to no knowledge of the available vehicle options. Using different tools, the users may gain information sufficient to let the user choose one or more vehicles for purchase. However, this process is time-consuming, with significant backtracking, dead ends, and unnecessary and/or redundant information presented to the user. There is therefore an opportunity to improve the search process.

SUMMARY

Systems, methods, and computer readable media for vehicular search recommendations using machine learning. In one example, a computing model may receive a query for a vehicular recommendation. The model may be trained based on training data comprising a plurality of historical queries, a plurality of web pages visited, and a plurality of attributes of vehicles. The model may generate a decision tree for the query, the decision tree comprising a plurality of paths for processing the query, the plurality of paths comprising a subset of a plurality of available paths for processing the query, each path associated with a plurality of search phases. The model may select, based on the decision tree, a first path of the plurality of paths for processing the query. The model may select, based on the first path, a first search phase of the plurality of search phases as corresponding to the query. The model may then return a search result corresponding to the first search phase as responsive to the query.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A illustrates an aspect of a graphical user interface in accordance with one embodiment.

FIG. 3C illustrates an aspect of a graphical user interface in accordance with one embodiment.

DETAILED DESCRIPTION

Figure 1:
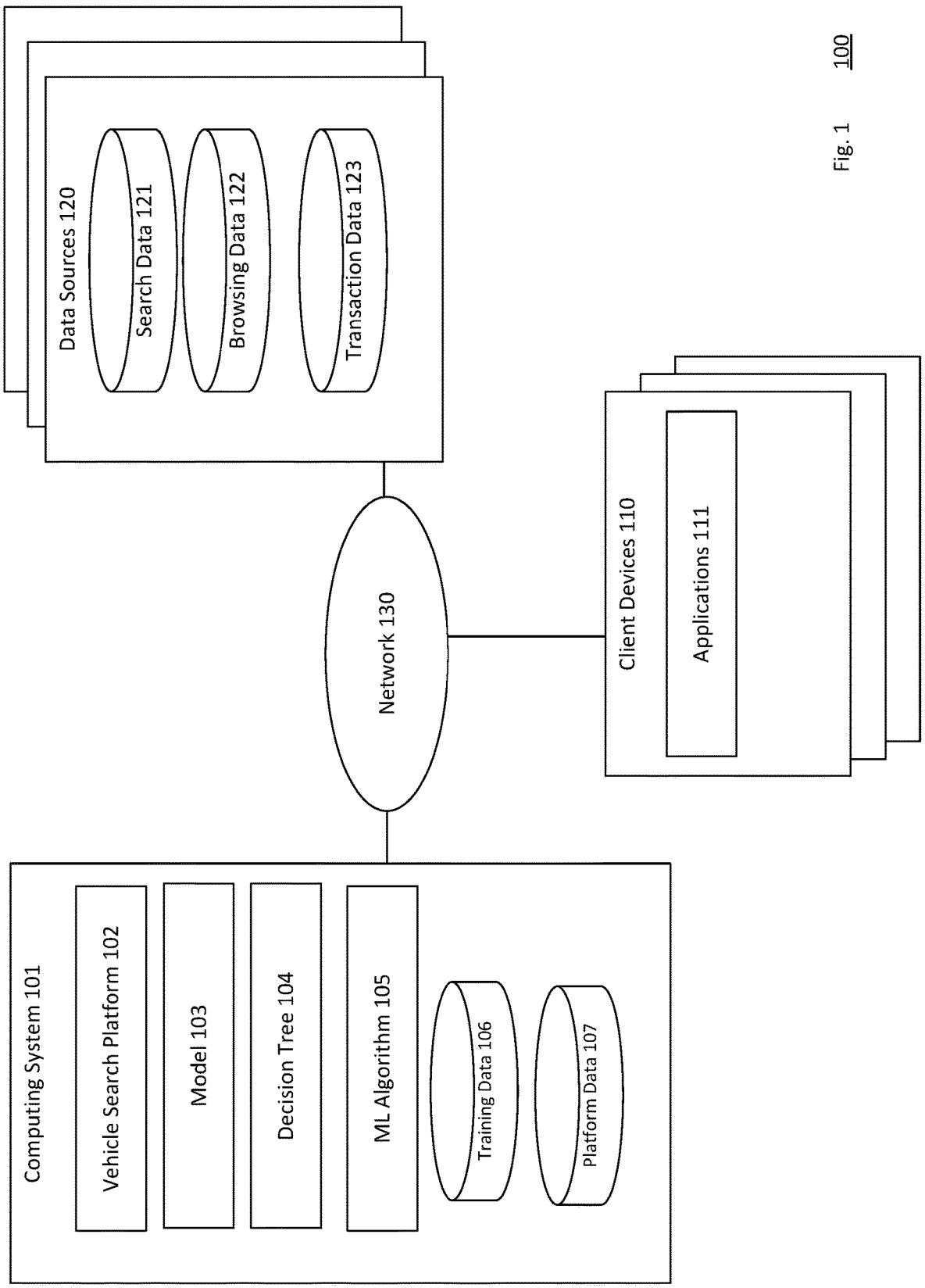
FIG. 1 illustrates an aspect of a system in accordance with one embodiment.

Embodiments disclosed herein provide techniques for improved vehicular search recommendations using machine learning. When searching for a vehicle, such as a car, a user may encounter an aggregation site that provides information describing a plurality of different car makes and/or models. The user may begin their search using a search term, or search query, that may initially be a broad term, such as "SUV" or "fast car". The search may be narrowed, e.g., to a specific vehicle, and then be broadened again to compare with other vehicle types. Often, the search may start over if the user eliminates an option, e.g., based on safety ratings, etc.

Advantageously, embodiments disclosed herein assist the user to complete their search more efficiently, thereby saving the user time, and reducing the amount of computing resources used to assist the user during their search. Generally, a computing model may be trained based on training data. The training data may include, but is not limited to, historical browsing patterns, search queries, web analytics, vehicular transaction data, user biographical data, vehicle metadata, and the like. The training data may include data for any number of users, browsing sessions, devices, vehicles, and/or transactions. Generally, the training of the model allows the model to identify a plurality of different search phases. The plurality of search phases may include any number and type of search phases. During training, the model may determine what type of information "completes" the search phase, such as returning safety ratings, pricing information, etc. Furthermore, the training of the model allows the model to generate a decision tree that includes a plurality of possible paths for processing a user's search. The plurality of paths may include one or more of the search phases. Advantageously, however, the model may not need to generate and/or process all possible paths. Similarly, the model may not include each possible search phase in each path. Advantageously, therefore, the model may process a subset of available information to improve the search for the user and/or complete the search with a sale.

For example, once trained, the model may receive a search query provided to an aggregation platform, such as "I am looking for an SUV." Based on the search query, the model may compute a decision tree that includes a plurality of phases for the query. The model may further identify which search phase the search query corresponds to. The model may further identify which paths should be processed, and which phases of each path should be processed. The model may then select at least one path and return information that allows the user to complete the identified search phase. As another example, the model may select and return information that allows the user to complete the search process, e.g., by selecting a car for purchase, completing a purchase, transmitting a request to a dealership to test drive a specific vehicle, etc.

Continuing with the "SUV" example, the model may return a specific type of SUV responsive to the query, highlight relevant information about the vehicle (e.g., safety ratings, fuel efficiency, etc.), and/or modify search results to eliminate a vehicle. In one example, one or more search phases may be skipped and therefore not processed. For example, rather than returning SUV safety ratings, the model may return pricing information for a list of curated SUVs that have high safety ratings. Doing so may spare the user from considering SUVs that do not have high safety ratings. Similarly, doing so allows the model and/or associated computing system from processing SUVs that do not have high safety ratings.

Advantageously, embodiments disclosed herein provide techniques to improve the vehicular search process using vehicle search systems. By training a model to identify search phases and what information completes a search phase, embodiments disclosed herein may improve the functioning of a computing system executing the model. For example, by refraining from processing information that does not complete a search phase and/or refraining from processing all possible paths of the decision tree, the computing system may use fewer computing resources and/or energy. Similarly, the performance of the search system may be improved by allowing users to complete searches more efficiently and using fewer computing resources.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts an exemplary computing architecture 100, also referred to as a system, consistent with disclosed embodiments. Although the computing architecture 100 shown in FIG. 1 has a limited number of elements in a certain topology, it may be appreciated that the computing architecture 100 may include more or less elements in alternate topologies as desired for a given implementation.

As shown, the computing architecture 100 comprises one or more computing systems 101, one or more client devices 110, and one or more data sources 120 connected via a network 130. The computing system 101, client devices 110, and data sources 120 are representative of any type of computing system or device, such as a server, compute cluster, cloud computing environment, virtualized computing system, laptop computer, desktop computer, smartphone, mobile device, and the like. Although not depicted for the sake of clarity, the computing devices 101, client devices 110, and data sources 120 each include one or more processor circuits to execute programs, code, and/or instructions and memory to store the programs, code, and/or instructions.

As shown, the computing system 101 includes an instance of a vehicle search platform 102, which is generally configured to allow users to search for vehicles, view attributes of vehicles, view pricing information for vehicles, research vehicles, and optionally purchase vehicles. One example of a vehicle search platform is the Auto Navigator® by Capital One®. For example, a user of an application 111 on a client device 110 may search for sports cars, SUVs, boats, or any other type of vehicle having a record in the platform data 107. The application 111 may be any type of application, such as a dedicated client application corresponding to the vehicle search platform 102, a web browser, smartphone application, and the like.

The computing system 101 further includes one or more machine learning (ML) models 103, one or more decision trees 104, one or more ML algorithms 105, and data stores of training data 106 and platform data 107. The ML models 103 may generally be trained based on the training data 106 and a ML algorithm 105. As described in greater detail herein, once trained, the ML models 103 may generate a decision tree 104 for a user interacting with the vehicle search platform 102. The ML models 103 are representative of any type of computing model, such as neural networks, support vector machines (SVM), and the like. Although ML models 103 are used as a reference example herein, the use of ML models 103 as a reference example should not be considered limiting of the disclosure. For example, the disclosure is equally applicable to other types of artificial intelligence, such as classifiers, hidden Bayesian networks, and the like.

The training data 106 may include any number and type of data related to the vehicle search platform 102. For example, the training data 106 may include data from the data sources 120, such as search data 121, browsing data 122, and/or transaction data 123. The search data 121 may include search queries submitted by different users of client devices 110 to the vehicle search platform 102 (e.g., natural language text queries, selectable elements in a user interface of the platform 102 that provide filtering criteria, etc.) and any other type of data describing user interactions with the vehicle search platform 102. The browsing data 122 may generally include web analytics describing different web pages accessed by the users of client devices 110, items clicked on by the users, specific vehicles viewed by the users, articles viewed by the users, manufacturer web pages viewed by the users, safety reports viewed for different vehicles, vehicular reviews viewed by the users, and the like. The browsing data 122 may include resources provided by the vehicle search platform 102 and/or resources from other sources, e.g., the Internet. The transaction data 123 may include data describing different vehicle transactions, where one or more of the vehicle transactions in the transaction data 123 originate from the vehicle search platform 102. The training data 106 may further include data describing a plurality of different vehicles, such as vehicle specifications, attributes, reviews, safety ratings, and the like. In some embodiments, the training data 106 includes data collected from the client devices 110 (e.g., using cookies), data from the data sources 120, and data collected by the computing devices 101. Similarly, the data stored by the data sources 120 may include data collected from the client devices 110 (e.g., using cookies) and data collected by the computing devices 101.

More generally, the training data 106 includes data describing a plurality of interactions with the vehicle search platform 102 by a plurality of different users. Generally, when searching for a vehicle, a user may initiate a search in the vehicle search platform 102 with a broad query, such as a query specifying to view a variety of different sports utility vehicles (SUVs). The user may then view specific details of one or more makes/models of SUV, compare details with other makes/models, view safety reports, view reviews of each vehicle, and the like. In some embodiments, the user may end the search for SUVs and start over by searching for different types of vehicles, such as luxury sedans.

Advantageously, based on the training of the ML model 103, the ML model 103 may create a plurality of phases that define a user's interaction with the vehicle search platform 102. The phases may include any number and type of phases. A phase may include, without limitation, a type of search query submitted by the user, a type of content viewed by the user, a type of operation performed by the user, and the like. For example, Table A may reflect the following search queries in a user's session with the vehicle search platform 102:

TABLE A

| | |
|---|---|
| 1. | SUVs |
| 2. | SUVs with good safety ratings |
| 3. | Make Z SUVs |
| 4. | Make Z Model A SUV |
| 5. | Make Z Model A Safety ratings |
| 6. | Make Z Safety Ratings |
| 7. | Make Z Model B |
| 8. | Make Y Model C |
| 9. | Make Y Model C vs. Make Z model B |
| 10. | Make Y Model C near me |

Therefore, Table A depicts ten example search queries submitted by the user to the vehicle search platform 102. However, any number and type of search queries may be submitted. Using Table A as a reference example, the trained ML model 103 may identify a plurality of different phases in Table A. Generally, the ML model 103 may determine phases based on patterns in the training data 106, e.g., by identifying repetitive searches, identifying which searches consistently lead to other searches, etc. For example, Table B reflects the different phases assigned to each search query:

TABLE B

| | | |
|---|---|---|
| 1. | SUVs | Phase A |
| 2. | SUVs with good safety ratings | Phase A |
| 3. | Make Z SUVs | Phase B |
| 4. | Make Z Model A SUV | Phase B |
| 5. | Make Z Model A Safety ratings | Phase C |

TABLE B-continued

| | | |
|---|---|---|
| 6. | Make Z Safety Ratings | Phase D |
| 7. | Make Z Model B | Phase E |
| 8. | Make Y Model C | Phase F |
| 9. | Make Y Model C vs. Make Z model B | Phase G |
| 10. | Make Y Model C near me | Phase H |

In some embodiments, the ML model 103 may tokenize each phase, e.g., by assigning a token, such as a unique identifier (ID), to each phase. Doing so allows the ML model 103 to determine how the different IDs (and therefore phases) are related, e.g., based on one ID flowing to another ID. Furthermore, the training of the ML model 103 allows the ML model 103 to determine what completes a given phase of searching. For example, the ML model 103 may determine that information about a vehicle, such as safety ratings, fuel efficiency, pricing information, and the like, may complete a given phase. As another example, the ML model 103 may determine events such as viewing a vehicle in person may complete a phase. More generally, the ML model 103 may determine that any type of data may complete a phase. For example, if viewing the safety ratings of Make Z, Model A eliminate the vehicle from the customer's consideration, the ML model 103 may determine that displaying the safety ratings may complete Phase C above in Table B.

Further still, the training of the ML model 103 therefore allows the ML model 103 to identify, given a current phase of the user, which phase is the next "best" phase to proceed to. For example, if the user is in Phase A, the ML model 103 may determine to bypass Phase B, and provide information related to Phase C, e.g., safety ratings for Make Z Model A. Stated differently, if the user specifies to search for SUVs in Phase A, the ML model 103 may skip one or more phases including Phase B, and provide the safety ratings for Make Z Model A to the user, as this information may complete this line of exploration by the user. Therefore, doing so may conserve resources by reducing the amount of processing done by the computing system 101. For example, by returning the safety ratings of Make Z Model A to the user responsive to the search query for SUVs, the search platform 102 may forego processing the query to return a plurality of different SUV types in phase B (e.g., from the platform data 107). Doing so conserves resources, as the computing system 101 need not process the query against the platform data 107, transmit the results to the client device 110, and/or process a response from the client device 110. Similarly, doing so may improve the amount of time a user spends navigating the search platform 102, thereby reducing overall computing resources and/or power consumption by the system 101. Furthermore, doing so may result in more advantageous outcomes, e.g., facilitating a sale of a vehicle while consuming fewer system resources and/or energy.

In some embodiments, the ML model 103 may update a user interface of the platform 102 to prioritize certain search filters, provide recommendations on search filters, and the like. Continuing with the previous example, the ML model 103 may emphasize a first search filter that would return safety ratings for Make Z Model A in the user interface (e.g., by listing the first search filter above other search filters in the user interface, highlighting the first search filter using bold, italics, colors, or other techniques, etc.). As another example, the ML model 103 may cause the user interface of the search platform 102 to provide a recommendation to select the first search filter. Embodiments are not limited in these contexts.

In at least one embodiment, the ML model 103 may be trained to generate a decision tree 104 for a given user's current session on the vehicle search platform 102. The ML model 103 may generate the decision tree 104 based on the current state of a user's session on the vehicle search platform 102. For example, the state may be a vector including any search queries submitted by the user, any pages viewed by the user, any attributes of the user stored in a user profile for the user in the platform data 106, and the like.

Figure 2A:
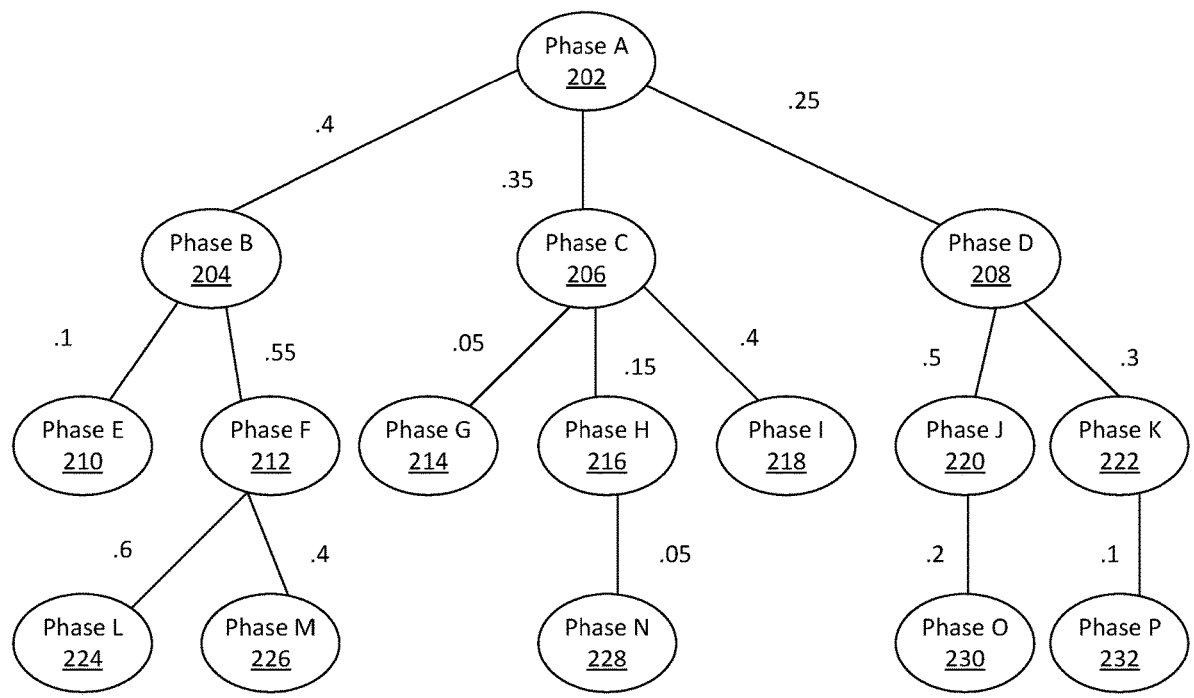
FIG. 2A illustrates an aspect of a decision tree in accordance with one embodiment.
Figure 2A:

FIG. 2A depicts an example decision tree 104-1. Generally, a decision tree includes a plurality of nodes, such as the nodes 202-232 of FIG. 2A. Each node may be connected to one or more other nodes via edges, thereby creating a plurality of paths within a given decision tree 104. Advantageously, the decision trees 104 generated by the ML model 103 facilitate elimination of some paths and elimination of one or more phases within a given path. Furthermore, the ML model 103 may prioritize a node, path, phase, or other any element of the decision tree 104. The ML model 103 may generate a decision tree 104 based on a user's session state, e.g., a user visiting the vehicle search platform 102 and accessing one or more resources therein. The state may generally describe the user's session.

For example, as depicted in FIG. 2A, each node 202-232 corresponds to a processing phase identified by the ML model 103 during training. Each edge in FIG. 2A includes a respective weight which generated by the ML model 103. Each edge weight reflects a probability that the user will follow the corresponding path in the decision tree 104-1. For example, node 202 corresponds to Phase A. Nodes 204, 206, and 208 are child nodes of node 202. The weights of the edges between node 202 and nodes 204, 206, and 208 are 0.4, 0.35, and 0.25, respectively. Therefore, if a user is at Phase A, the decision tree 104-1 computed by the ML model 103 reflects a 40% probability that the user will proceed to Phase B (corresponding to node 204), a 35% probability that the user will proceed to Phase C (corresponding to node 206), and a 25% probability that the user will proceed to Phase D (corresponding to node 208). In such examples, the ML model 103 may emphasize elements of phase B (relative to elements of Phases C or D) in a user interface of the search platform 102 when the user is at Phase A, e.g., by removing search filters that would lead to Phases C or D, emphasizing search filters that would lead to Phase B, prioritizing navigation elements that lead to Phase B, etc.).

Figure 2B:
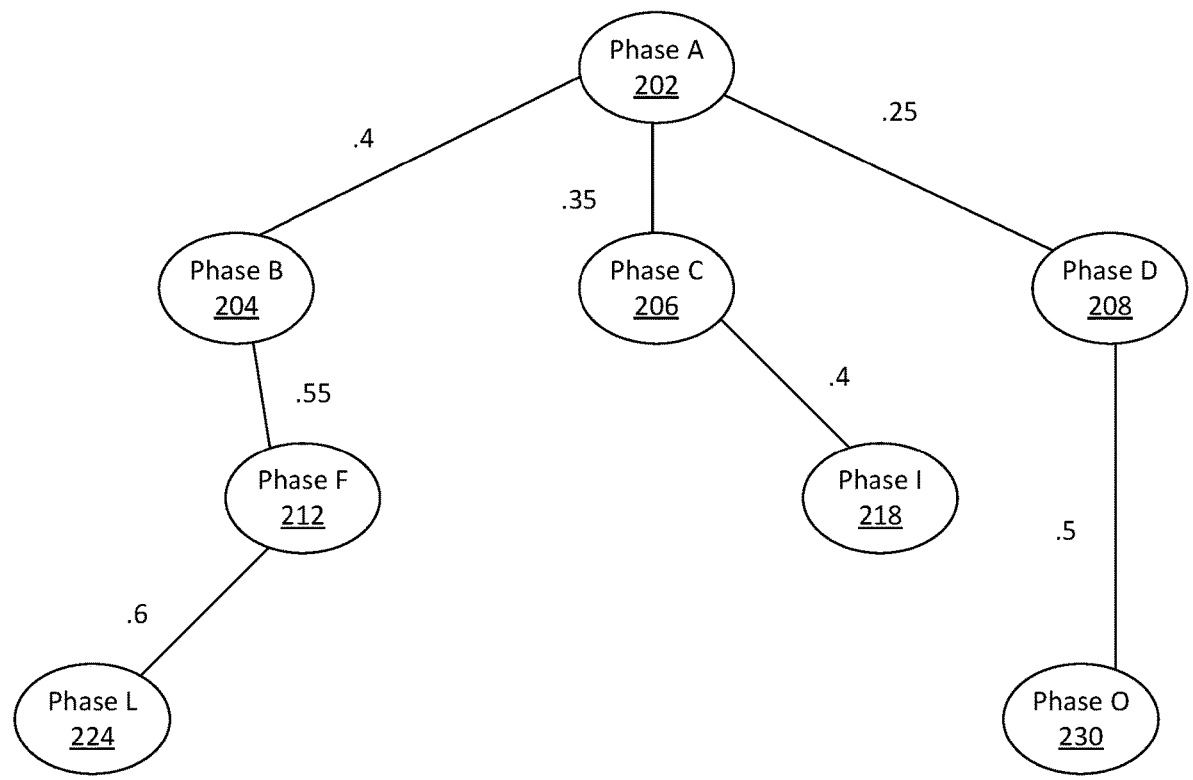
FIG. 2B illustrates an aspect of a decision tree in accordance with one embodiment.
Figure 2B:

The decision tree 104-1 depicted in FIG. 2A reflects a "complete" decision tree such that all possible phases and/or paths in the tree 104-1 have been processed and/or considered. FIG. 2B illustrates an optimized decision tree 104-2 that does not include all phases and/or paths of the decision tree 104-1. Stated differently, the decision tree 104-2 may include a subset of the nodes of decision tree 104-1 and/or a subset of the paths of decision tree 104-1. Doing so allows the vehicle search platform 102 to return more accurate, relevant information to a user while consuming fewer computing resources.

For example, as shown, the trained ML model 103 may remove (or otherwise does not include) node 210, corresponding to Phase E, from the decision tree 104-2 relative to the decision tree 104-1. In at least one embodiment, the ML model 103 does not include node 210 based on the path weight of 0.1 assigned to the edge between nodes 204 and 210. In addition and/or alternatively, the ML model 103 does not include node 210 based on a determination that information corresponding to node 210 would not complete a search phase, e.g., Phase B corresponding to node 204. Embodiments are not limited in these context.

More generally, for example, if node 210 corresponds to SUV safety ratings, while the user has searched for a sports car at Phase A, the ML model 103 may remove or otherwise not consider node 210 from the decision tree 104-2, as it is unlikely the user will transition to SUVs while searching for sports cars. Advantageously, doing so conserves system resources by allowing the computing system 101 to refrain from processing node 210 as well as any child nodes of node 210 when processing a user's state.

Further still, the decision tree 104-2 may be used to more efficiently identify the next phase of a user's session with the vehicle search platform 102. For example, if the model 103 determines the user is currently at Phase D, corresponding to node 208, the ML model 103 may use the reduced decision tree 104-2 to return a result or other information corresponding to Phase O, which corresponds to node 230, which is the only child node of node 208. For example, the ML model 103 may use the reduced decision tree 104-2 to emphasize user interface elements related to Phase O, remove user interface elements related to other Phases, etc. Doing so may allow the user to complete their search, or the phase of their search, more quickly and/or by consuming fewer resources, because the ML model 103 uses the decision tree 104-2 to bypass search phases by identifying the information that will complete the current phase of the user's search.

For example, if Phase D is generally related to a user searching for "SUVs with good safety ratings," Phase O may correspond to safety ratings for a specific make/model of SUV. The ML model 103 may determine that the safety ratings for the specific make/model at Phase O may complete Phase D for the user. In such examples, the ML model 103 may modify the user interface of the search platform 102 to assist the user in navigating to Phase O (e.g., by providing search filters for safety ratings, emphasizing/prioritizing the search filters for safety ratings, emphasizing the safety ratings in the user interface, or otherwise assisting the user to navigate to Phase O etc.). Additionally and/or alternatively, the ML model 103 returns Phase O based on the weight of the edge between Phases D and O. In some embodiments, the edge weight between Phases D and O may allow the model 103 to determine that Phase O completes Phase D, e.g., based on the edge weight exceeding a threshold weight. Therefore, responsive to the query for "SUVs with good safety ratings," the ML model 103 may return safety ratings for the specific make/model of SUV associated with Phase O/node 230. Doing so may eliminate one or more other search phases, such as the user viewing a list of SUVs which may or may not have good safety ratings and selecting the specific make/model to view the safety ratings of thereof. More generally, the system 100 guides users through vehicle searches on the vehicle search platform 102, assisting users from their initial search to a final vehicle selected for purchase faster and with less stress to the user.

Advantageously, the amount of processing performed by the computing system 101 is reduced, as the computing system 101 need not consider Phase J, corresponding to node 220 of decision tree 104-1 of FIG. 2A. Similarly, the computing system 101 need not consider Phases K or P, corresponding to nodes 222, 232 of decision tree 104-1. Similarly, the computing system 101 does not consume resources by foregoing the transmission or other processing of data to the client device 110. For example, if Phase J corresponds to search results for a query specifying a specific make/model of vehicle, the computing system 101 need not process the query, transmit the results to the client device 110, and/or perform any other operations related to Phase J.

FIG. 3A illustrates a graphical user interface (GUI) 300 of the vehicle search platform 102, which may be accessed via a client device 110 (not pictured). As shown, the GUI 300 includes a text search field 301 that may be used to submit a query using the submit button 302. As shown, the user has entered a text query of "SUV" in the search field 301. Additionally, as shown, the GUI 300 may include one or more optional criteria 303 that may be selected by the user. If any of the optional criteria 303 are selected, the query submitted via the button 302 includes any text in the text field 301 and the selected criteria 303. In some embodiments, selection of one of the optional criteria 303 automatically initiates a search based on that criterion. For example, in such embodiments, selecting the "fuel efficient" criterion 303 may submit a query for all fuel efficient vehicles, regardless of any text entered into field 301. In some embodiments, the search criteria 303 may be selected by the ML model 103 based on a respective priority of each of the search criteria 303. For example, the ML model 103 may select and return the depicted search criteria 303, while excluding less relevant search criteria. As another example, the ML model 103 may order the search criteria 303 relative to the respective importance of each criterion determined by the ML model 103. Therefore, the ordering depicted in FIG. 3A may reflect a determination, by the ML model 103, that "fuel efficient" is the most important feature, or search criterion, at the current phase of the user's search. In some embodiments, the ML model 103 may emphasize one or more of the search criteria 303, e.g., via highlighting, bolding, italicizing, adding a popup, etc.

When the user submits a query, e.g., via the submit button 302, the ML model 103 may receive the query and additional data as input. The additional data may include any operations performed by the user on the vehicle search platform 102, pages visited by the user on the vehicle search platform 102, profile data from a user profile for the user, and any other data attributes. As stated, the ML model 103 may process the query along with the other data to generate a decision tree 104 for the user's session. The decision tree 104 may include a subset of the possible paths for processing the query and/or a subset of the possible phases for guiding the user.

Figure 3B:
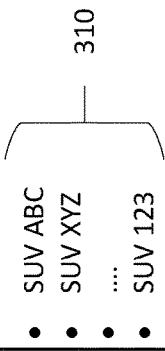
FIG. 3B illustrates an aspect of a graphical user interface in accordance with one embodiment.

FIG. 3B illustrates the GUI 300 generated responsive to the user submitting the query "SUV" in FIG. 3A, according to one embodiment. As shown, the ML model 103 has outputted a plurality of search results 310, which may be selected from the platform data 107. Advantageously, however, the search results 310 include search results for fuel efficient SUVs, even though the user did not specify to search for fuel efficient vehicles. The ML model 103 and/or search platform 102 may therefore select the "fuel efficient" box for the user in the GUI 300 based on the search results 310. For example, the ML model 103 may determine that the "fuel efficient" box is the most important feature relative to the other criteria (e.g., safety features, sporty, etc.). Based on this determination, the ML model 103 and/or the search platform 102 may select the "fuel efficient" box for the user in the GUI 300. In addition and/or alternatively, the ML model 103 and/or the search platform 102 may emphasize the "fuel efficient" box in the GUI 300, e.g., by highlighting the "fuel efficient" box, bolding the "fuel efficient" box, italicizing the "fuel efficient" box, adding a popup directed to the "fuel efficient" box, etc.

As stated, the ML model 103 may determine that returning fuel efficient vehicles may correspond to the next phase of the user's search, as the ML model 103 may determine that fuel efficiency information may allow the user to complete the current phase (e.g., the phase corresponding to the submission of the "SUV" query). In some embodiments, the ML model 103 determines the fuel efficiency information based on generating a decision tree 104 for the query. The decision tree 104 may include a subset of the possible phases and/or possible paths for the user's query. For example, conventional solutions may output a list including all available SUVs responsive to the query "SUV." Advantageously, however, the ML model 103 allows the computing system 101 to forego complete processing of the "SUV" query and perform more limited processing on the query. Therefore, stated differently, the ML model 103 obviates the need for the system 101 to process the "SUV" query of FIG. 3A, return a plurality of SUV results to the user via the network 130, and receive input specifying that the user would like to learn more about the fuel efficiency of each vehicle. Instead, the fuel efficiency data is presented directly to the user without requiring user input and requiring fewer computing resources. Furthermore, the GUI 300 may be updated to emphasize the fuel efficiency data, or otherwise emphasize GUI elements that allow the user to quickly navigate to the fuel efficiency data.

FIG. 3C illustrates the GUI 300 after the user selected "SUV 123" in FIG. 3B, which may be an example make/model of SUV. The ML model 103 may receive the selection of "SUV 123" as input and process the input accordingly. In some embodiments, the ML model 103 may generate a new decision tree 104 based on the current state of the user. In other embodiments, the ML model 103 uses the previously generated decision tree 104. Regardless of whether the ML model 103 generates a new decision tree 104, the ML model 103 may use the decision tree 104 to select a processing path for the query. In some embodiments, the ML model 103 selects the processing path based on the weights between the node for the current phase and one or more child nodes. The ML model 103 may then select a phase in the selected processing path that completes the current phase. The ML model 103 may then select search results that correspond to the selected phase and transmits the results to the client device 110.

For example, as shown, the GUI 300 includes search results 330 that includes attributes of SUV 123. Advantageously, however, the GUI 300 includes search results 340. The search results 340 include local inventory for a different SUV, namely SUV ABC. The ML model 103 may return the search results 340 by selecting a processing path for "SUV 123", selecting a phase that would complete the phase "SUV 123", and returning results corresponding to the selected phase. Stated differently, the ML model 103 may determine that the fuel efficiency of SUV 123, when viewed, causes users to eliminate SUV 123 from further consideration. The ML model 103 may then determine that users who considered SUV 123 ultimately purchased SUV ABC, which would complete the current phase of search for the user. Therefore, rather than processing requests to view the fuel efficiency of SUV 123, the computing system 101 may instead return local inventory for SUV ABC via the results 340. Doing so conserves computing resources of the computing system 101 and the client device 110 and improves the functioning thereof. The user may then select one of the search results 340 to view more information, schedule a test drive, etc.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 4:
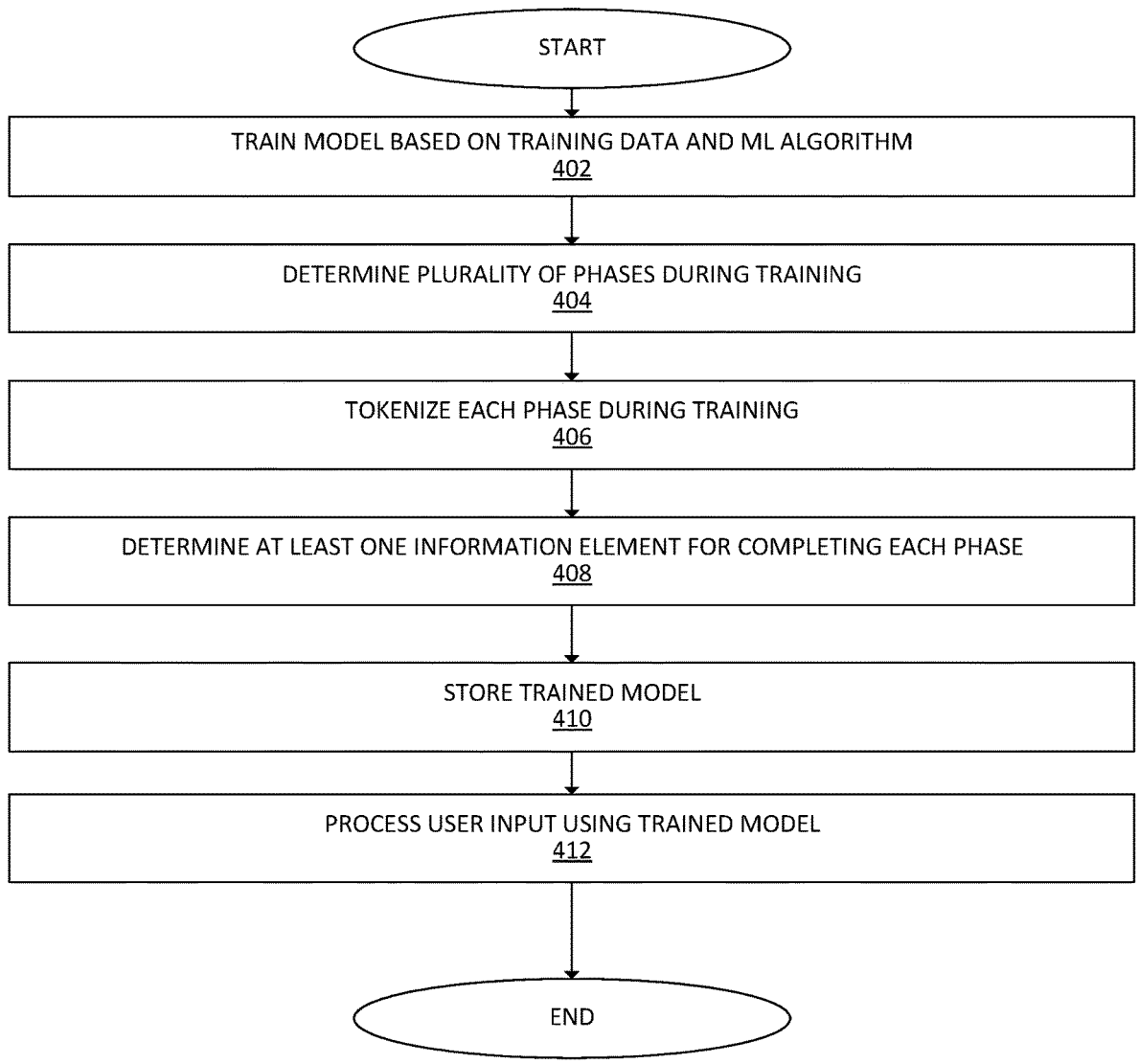
FIG. 4 illustrates a first logic flow in accordance with one embodiment.

FIG. 4 illustrates an embodiment of a logic flow 400. The logic flow 400 may be representative of some or all of the operations executed by one or more embodiments described herein. For example, the logic flow 400 may include some or all of the operations to train a ML model to provide vehicular search recommendations using machine learning. Embodiments are not limited in this context.

As shown, the logic flow 400 begins at block 402, where an ML model 103 is trained based on training data 106 and a ML algorithm 105. At block 404, the training of the ML model 103 causes the ML model 103 to define a plurality of distinct search phases. At block 406, the ML model 103 may tokenize each phase during training, e.g., by assigning each phase a respective token, or unique identifier. At block 408, the ML model 103 may determine at least one information element for completing each phase identified at block 404.

At block 410, the trained ML model 103 may be stored in a storage medium for later use. At block 412, the trained model 103 may process user input, such as a search query. Generally, once trained, the ML model 103 may generate a decision tree 104 that is used to process the user input as described in greater detail herein.

Figure 5:
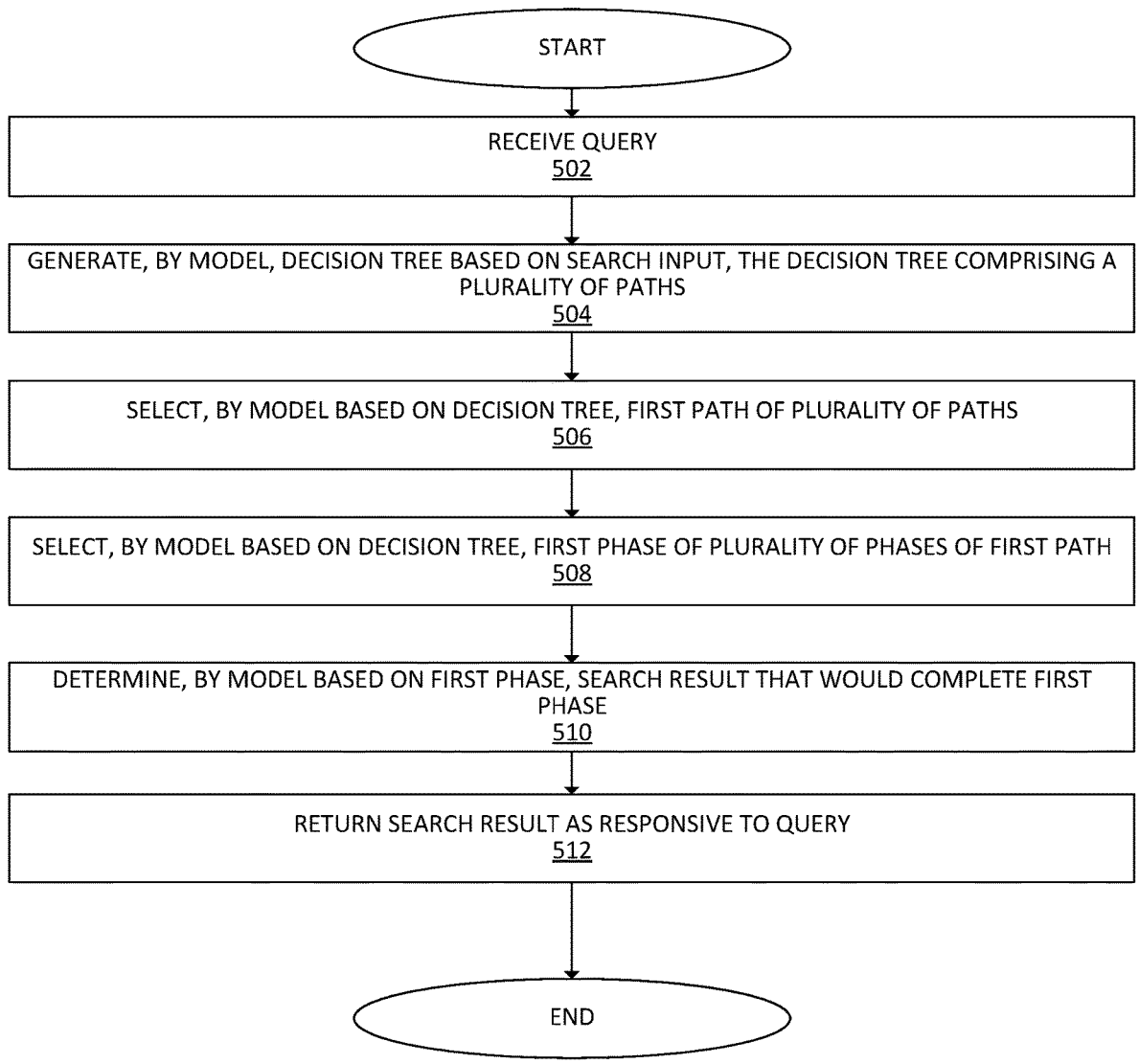
FIG. 5 illustrates a second logic flow in accordance with one embodiment.

FIG. 5 illustrates an embodiment of a logic flow 500. The logic flow 500 may be representative of some or all of the operations executed by one or more embodiments described herein. For example, the logic flow 500 may include some or all of the operations to use a trained ML model to provide vehicular search recommendations. Embodiments are not limited in this context.

As shown, the logic flow 500 begins at block 502, where a user may provide input comprising a query to the vehicle search platform 102. The input may be text, selectable GUI elements, and the like. The input may be provided to the trained ML model 103. At block 504, the ML model 103 generates a decision tree 104 based on the input received at block 502 and/or any additional input. The decision tree may comprise a plurality of paths, but only a subset of possible paths for processing the query. Similarly, the decision tree 104 may include a plurality of nodes, but only a subset of all possible nodes (or phases corresponding to nodes). At block 506, the ML model 103 selects, based on the decision tree 104, a first path of the plurality of paths. The path may include one or more child nodes in the tree 104 relative to the current node in the tree. At block 508, the ML model 103 may select, based on the decision tree 104, a first phase of plurality of phases of the first path. The first phase may correspond to one of the nodes in the first path selected at block 506. At block 510, the ML model 103 may determine, by based on the first phase selected at block 508, one or more search results in the platform data 107 that would complete the first phase. At block 512, the ML model 103 returns the search results identified at block 510 as responsive to query, e.g., via one or more user interfaces in the vehicle search platform 102. Furthermore, in addition to returning the search results, the user interface may be updated to emphasize or prioritize certain search filters, provide recommendations on search filters, etc.

Figure 6:
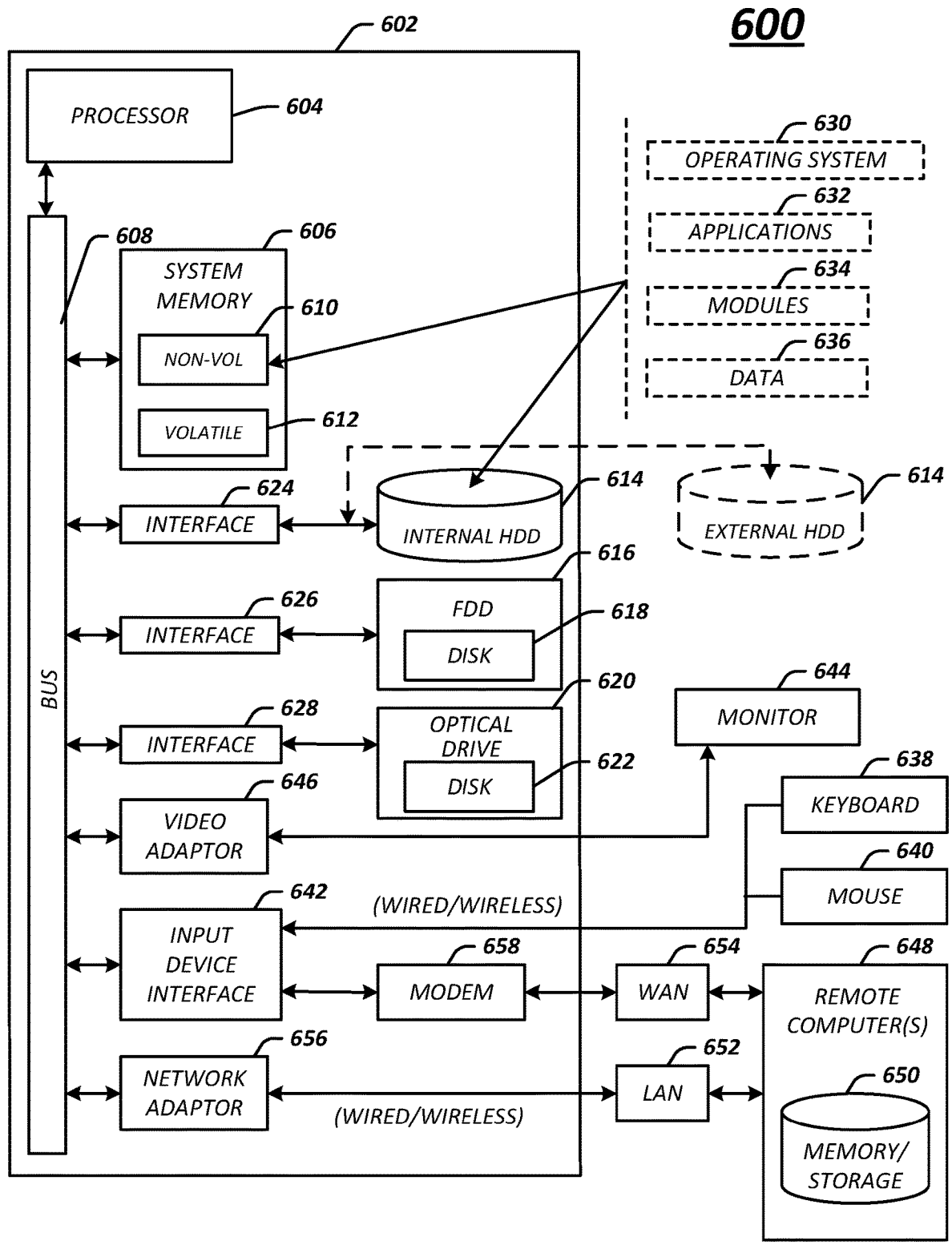
FIG. 6 illustrates a computer architecture in accordance with one embodiment.

FIG. 6 illustrates an embodiment of an exemplary computer architecture 600 comprising a computing system 602 suitable for implementing various embodiments as previously described. In one embodiment, the computer architecture 600 may include or be implemented as part of system 100. In some embodiments, computing system 602 may be representative, for example, of the computing devices 101, client devices 110, and data sources 120 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" are intended to refer to a computer-related entity, either hardware, a combination of hardware and software, software, or software in execution, examples of which are provided by the exemplary computing computer architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing system 602 includes a processor 612, a system memory 604 and a system bus 606. The processor 612 can be any of various commercially available processors.

The system bus 606 provides an interface for system components including, but not limited to, the system memory 604 to the processor 612. The system bus 606 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 604 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 604 can include non-volatile 610 and/or volatile 612. A basic input/output system (BIOS) can be stored in the non-volatile 610.

The computer 602 may include various types of computer-readable storage media in the form of one or more lower speed memory units, including an internal (or external) hard disk drive 630, a magnetic disk drive 616 to read from or write to a removable magnetic disk 620, and an optical disk drive 628 to read from or write to a removable optical disk 632 (e.g., a CD-ROM or DVD). The hard disk drive 630, magnetic disk drive 616 and optical disk drive 628 can be connected to system bus 606 the by an HDD interface 614, and FDD interface 618 and an optical disk drive interface 634, respectively. The HDD interface 614 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 610, and volatile 612, including an operating system 622, one or more applications 642, other program modules 624, and program data 626. In one embodiment, the one or more applications 642, other program modules 624, and program data 626 can include, for example, the various applications and/or components of the system 100, such as the vehicle search platform 102, ML model 103, decision tree 104, training data 106, platform data 107, applications 111, search data 121, browsing data 122, and/or transaction data 123.

A user can enter commands and information into the computer 602 through one or more wire/wireless input devices, for example, a keyboard 650 and a pointing device, such as a mouse 652. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 612 through an input device interface 636 that is coupled to the system bus 606 but can be connected by other interfaces such as a parallel port, IEEE 1394 serial port, a game port, a USB port, an IR interface, and so forth.

A monitor 644 or other type of display device is also connected to the system bus 606 via an interface, such as a video adapter 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory and/or storage device 658 is illustrated. The logical connections depicted include wire/wireless connectivity to a local area network 656 and/or larger networks, for example, a wide area network 654. Such LAN and WAN networking environments are commonplace in offices and companies, and facilitate enterprise-wide computer networks, such as intranets, all of which may connect to a global communications network, for example, the Internet.

When used in a local area network 656 networking environment, the computer 602 is connected to the local area network 656 through a wire and/or wireless communication network interface or network adapter 638. The network adapter 638 can facilitate wire and/or wireless communications to the local area network 656, which may also include a wireless access point disposed thereon for communicating with the wireless functionality of the network adapter 638.

When used in a wide area network 654 networking environment, the computer 602 can include a modem 640, or is connected to a communications server on the wide area network 654 or has other means for establishing communications over the wide area network 654, such as by way of the Internet. The modem 640, which can be internal or external and a wire and/or wireless device, connects to the system bus 606 via the input device interface 636. In a networked environment, program modules depicted relative to the computer 602, or portions thereof, can be stored in the remote memory and/or storage device 658. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
    receiving, by a computing model executing on a processor, a query for a vehicular recommendation, wherein the computing model is trained:
        based on training data comprising: a plurality of historical queries, a plurality of web pages visited, and a plurality of attributes of vehicles,
        to select a plurality of search phases from a set of possible search phases for a decision tree based on an input query, and
        to determine search result information that completes each of the plurality of phases;
    generating, by the computing model, the decision tree for the query, the decision tree comprising a plurality of paths for processing the query, the plurality of paths comprising a subset of a plurality of available paths for processing the query, each path associated with one of the plurality of search phases;
    selecting, by the processor based on the decision tree, a first path of the plurality of paths for processing the query;
    selecting, by the processor based on the first path, a first search phase of the plurality of search phases as corresponding to the query; and
    returning by the processor, a search result corresponding to the first search phase as responsive to the query,
    wherein the training of the computing model further comprises generating the plurality of search phases based on the training data, wherein each search phase of the plurality of search phases is a distinct search phase.

2. The method of claim 1, wherein the training of the computing model further comprises tokenizing each search phase with a respective token.

3. The method of claim 1, wherein selecting the first search phase bypasses a second search phase of the plurality of search phases, wherein the second search phase is prior to the first search phase, wherein the computing model generates the decision tree for the query without processing the second search phase.

4. The method of claim 3, further comprising:
- determining, by the processor based on the decision tree, that the search result would complete the first search phase; and
- selecting, by the processor, the search result based on the determination that the search result would complete the first search phase.

5. The method of claim 1, wherein the search result comprises one or more of: (i) a recommended vehicle, (ii) a recommended web page, and (iii) an attribute of a vehicle, the method further comprising:
- updating, by the processor, a graphical user interface (GUI) displaying the search result to include a first search filter based on a determination by the computing model that the first search filter is associated with the first search phase, wherein the first search filter is associated with at least one of the recommended vehicle and the attribute of the vehicle; and
- updating, by the processor, the GUI to remove a second search filter based on a determination by the computing model that the second search filter is not associated with the first search phase.

6. The method of claim 1, wherein the decision tree comprises a plurality of nodes, wherein each node is associated with a respective probability computed by the computing model, wherein the plurality of paths comprise a respective subset of the plurality of nodes.

7. The method of claim 1, wherein each of the plurality of search phases defines user interaction with a platform receiving the query, the plurality of phases comprising at least one of a type of search query submitted by a user, a type of content viewed by the user, or a type of operation performed by the user.

8. A system, comprising:
- a processor; and
- a memory storing instructions that when executed by the processor cause the processor to:
  - receive, by a computing model, a query for a vehicular recommendation, wherein the computing model is trained:
    - based on training data comprising: a plurality of historical queries, a plurality of web pages visited, and a plurality of attributes of vehicles,
    - to select a plurality of search phases from a set of possible search phases for a decision tree based on an input query, and
    - to determine search result information that completes each of the plurality of phases;
  - generate, by the computing model, the decision tree for the query, the decision tree comprising a plurality of paths for processing the query, the plurality of paths comprising a subset of a plurality of available paths for processing the query, each path associated with one of the plurality of search phases;
  - select, based on the decision tree, a first path of the plurality of paths for processing the query;
  - select, based on the first path, a first search phase of the plurality of search phases as corresponding to the query; and
  - return a search result corresponding to the first search phase as responsive to the query,
  - wherein the training of the computing model further comprises generating the plurality of search phases based on the training data, wherein each search phase of the plurality of search phases is a distinct search phase.

9. The system of claim 8, wherein the training of the computing model further comprises tokenizing each search phase with a respective token.

10. The system of claim 8, wherein selecting the first search phase bypasses a second search phase of the plurality of search phases, wherein the second search phase is prior to the first search phase, wherein the computing model generates the decision tree for the query without processing the second search phase.

11. The system of claim 10, the memory storing instructions that when executed by the processor cause the processor to:
- determine, based on the decision tree, that the search result would complete the first search phase; and
- select the search result based on the determination that the search result would complete the first search phase.

12. The system of claim 8, wherein the search result comprises one or more of: (i) a recommended vehicle, (ii) a recommended web page, and (iii) an attribute of a vehicle, the memory storing instructions that when executed by the processor cause the processor to:
- update a graphical user interface (GUI) displaying the search result to include a first search filter based on a determination by the computing model that the first search filter is associated with the first search phase, wherein the first search filter is associated with at least one of the recommended vehicle and the attribute of the vehicle; and
- update the GUI to remove a second search filter based on a determination by the computing model that the second search filter is not associated with the first search phase.

13. The system of claim 8, wherein the decision tree comprises a plurality of nodes, wherein each node is associated with a respective probability computed by the computing model, wherein the plurality of paths comprise a respective subset of the plurality of nodes.

14. The system of claim 8, wherein each of the plurality of search phases defines user interaction with a platform receiving the query, the plurality of phases comprising at least one of a type of search query submitted by a user, a type of content viewed by the user, or a type of operation performed by the user.

15. A non-transitory computer-readable storage medium storing computer-readable program code executable by a processor to cause the processor to:
- receive, by a computing model, a query for a vehicular recommendation, wherein the computing model is trained:
  - based on training data comprising: a plurality of historical queries, a plurality of web pages visited, and a plurality of attributes of vehicles,
  - to select a plurality of search phases from a set of possible search phases for a decision tree based on an input query, and
  - to determine search result information that completes each of the plurality of phase;
- generate, by the computing model, the decision tree for the query, the decision tree comprising a plurality of paths for processing the query, the plurality of paths comprising a subset of a plurality of available paths for processing the query, each path associated with one of the plurality of search phases;

select, based on the decision tree, a first path of the plurality of paths for processing the query;

select, based on the first path, a first search phase of the plurality of search phases as corresponding to the query; and return a search result corresponding to the first search phase as responsive to the query, wherein the training of the computing model further comprises generating the plurality of search phases based on the training data, wherein each search phase of the plurality of search phases is a distinct search phase.

16. The computer-readable storage medium of claim 15, wherein the training of the computing model further comprises tokenizing each search phase with a respective token.

17. The computer-readable storage medium of claim 15, wherein selecting the first search phase bypasses a second search phase of the plurality of search phases, wherein the second search phase is prior to the first search phase, wherein the computing model generates the decision tree for the query without processing the second search phase.

18. The computer-readable storage medium of claim 17, storing computer-readable program code executable by the processor to cause the processor to:

determine, based on the decision tree, that the search result would complete the first search phase; and select the search result based on the determination that the search result would complete the first search phase.

19. The computer-readable storage medium of claim 15, wherein the search result comprises one or more of: (i) a recommended vehicle, (ii) a recommended web page, and (iii) an attribute of a vehicle, wherein the decision tree comprises a plurality of nodes, wherein each node is associated with a respective probability computed by the computing model, wherein the plurality of paths comprise a respective subset of the plurality of nodes, the medium storing computer-readable program code executable by the processor to cause the processor to:

update a graphical user interface (GUI) displaying the search result to include a first search filter based on a determination by the computing model that the first search filter is associated with the first search phase, wherein the first search filter is associated with at least one of the recommended vehicle and the attribute of the vehicle; and update the GUI to remove a second search filter based on a determination by the computing model that the second search filter is not associated with the first search phase.

20. The computer-readable storage medium of claim 15, wherein each of the plurality of search phases defines user interaction with a platform receiving the query, the plurality of phases comprising at least one of a type of search query submitted by a user, a type of content viewed by the user, or a type of operation performed by the user.

* * * * *